Figure 1:
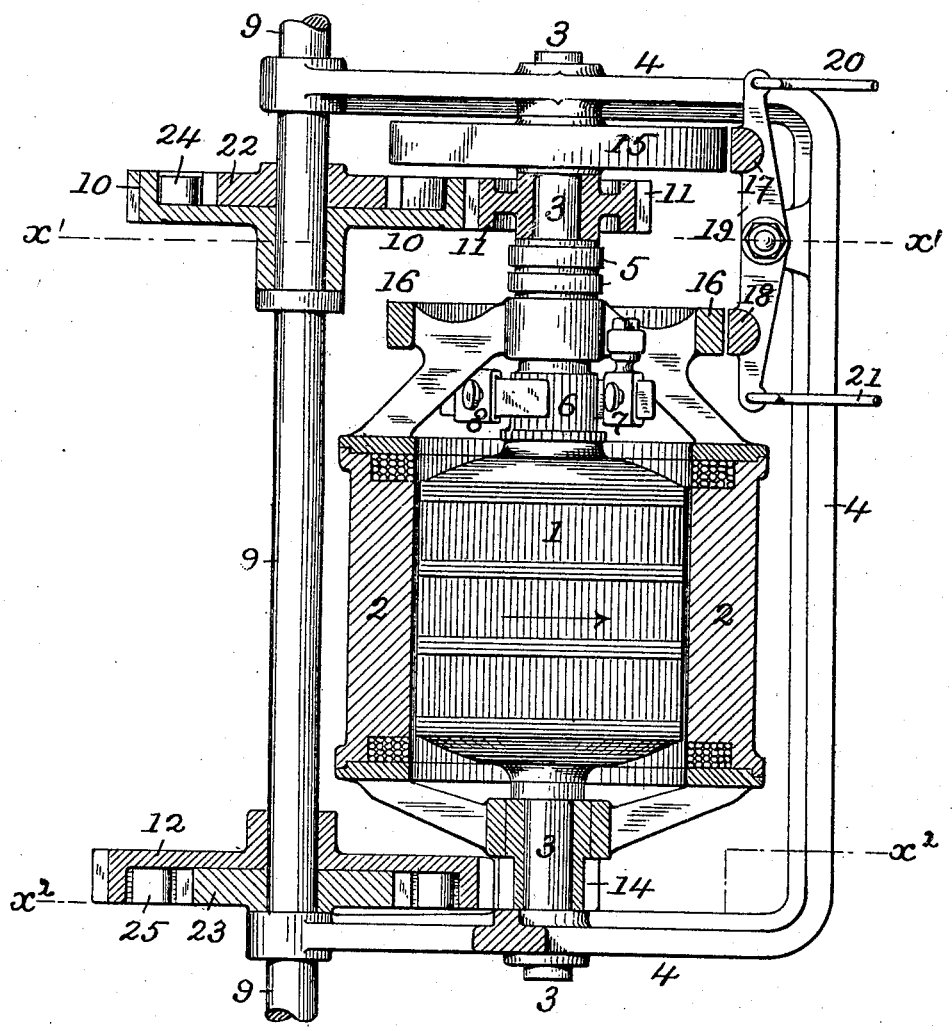

(No Model.) 2 Sheets—Sheet 2.

C. J. COLEMAN.
ELECTRIC MOTOR.

No. 516,916. Patented Mar. 20, 1894.

ATTEST:
Geo. H. Arthur
M. H. Holmes.

INVENTOR:
Clyde J. Coleman,
by Robert Burns
Att'y.

UNITED STATES PATENT OFFICE.

CLYDE J. COLEMAN, OF CHICAGO, ILLINOIS, ASSIGNOR OF ONE-HALF TO CHARLES ODELL, OF SAME PLACE.

ELECTRIC MOTOR.

SPECIFICATION forming part of Letters Patent No. 516,916, dated March 20, 1894.

Application filed January 21, 1893. Serial No. 459,271. (No model.)

*To all whom it may concern:*

Be it known that I, CLYDE J. COLEMAN, a citizen of the United States, residing at Chicago, in the county of Cook and State of Illinois, have invented certain new and useful Improvements in Electric Motors; and I do hereby declare the following to be a full, clear, and exact description of the same, reference being had to the accompanying drawings, forming part of this specification.

This invention relates to that class of electric motors in which the armature and field magnet or magnets are arranged in bearings and adapted to rotate in opposite directions around a common axis.

The object of the present improvement is to provide a simple and efficient method of coupling the revolving armature and the revolving field magnet or magnets, to the driven shaft in a differential manner, so that the speed of such driven shaft will vary with the load imposed, the speed or velocity of the motor remaining constant; as a consequence, of such constancy the greatest efficiency is attained, it being a well established fact that the greatest efficiency is attained in an electric motor at its normal speed; a further advantage in such constancy in the speed of the motor, is that all danger is avoided from a burning out of the armature coils, due to a decrease of speed in the motor caused by an over-load; as well as the requirement of but a normal amount of current fed into the motor under all the varying conditions of load imposed thereon.

In its higher state of perfection the present invention contemplates the use of an independent clutch for the revolving armature, and the revolving field, so that either one or the other can be held in a stationary condition, in the attainment of the several distinct speeds of the driven shaft as follows: a slow speed, due to a revolving armature and a revolving field; a fast speed, due to a revolving armature and a stationary field; and an intermediate speed, due to a stationary armature and revolving field. When however, it is not desired to employ all of such speeds, one of the clutches (the armature clutch for instance), can be dispensed with, and two distinct speeds be still attained, i. e., the fast speed due to a revolving armature and stationary field; and the slow speed due to a revolving armature and a revolving field.

It is an accepted fact among electricians that electric motors will take more current when standing still than when running at their normal speed, owing to the fact that when in motion the motor cuts line of force, and acts as a generator to set up a counter electric motive force, to oppose the initial electro motive force, and regulates the amount of current being fed into the motor. As usually constructed electric motors, when over-loaded, so that they cannot attain the necessary speed to set up a sufficient counter electric motive force, to oppose the initial electric motive force, a larger amount of current, than the armature coils were designed to carry, will flow through the armature and cause a burning out of the same; to avoid such danger of burning out of the armature it has heretofore been the usual practice to construct the motor sufficiently large, so that it will readily assume the necessary speed to set up counter electro motive force to sufficiently oppose the initial electro motive force, and avoid "burn outs." By the present invention such results are attained with a smaller motor, and in a more efficient and practical manner, by allowing the motor to assume its normal speed immediately; the driven shaft or load gradually acquiring its normal speed, as its inertia is overcome. At the same time a motor is furnished in which the same amount of current will suffice in the starting, as well as the continued operation of the motor; from this uniform current requirement there follows, when applied to street car propulsion and analogous uses, a material reduction in the first cost of the plant as well as the subsequent running expenses of the same, owing to the fact that the gross amount of electric current to be generated is reduced to a minimum, while the size and cost of the electric generators, steam engine, and other attachments are correspondingly reduced.

The present invention is also specially adapted for very advantageous use in connection with storage batteries, for street car propulsion and like uses, in that it does not create an irregular or excessive demand upon the storage batteries, either in the starting of the car, to overcome the inertia of the same, or during the running of the car when extra load is imposed upon the motor, but on the contrary takes a uniform and regular current from the battery at all times, and thus avoids the usual injurious effects on the plates of the storage battery due to irregular and heavy discharges therefrom, such as the disintegration of the active coating, buckling of the plates, &c.

In the practical use of the present invention a small rheostat may be employed with advantage in the initial starting of the motor, so as to aid in a more gradual starting of the same, and which is not required for use at any other time, but such use of a rheostat forms no part of the present invention.

To enable others skilled in the art to which my present invention appertains to make and use the same, I will now proceed to describe more fully its construction and use, reference being had to the accompanying drawings in which—

Figure 2:
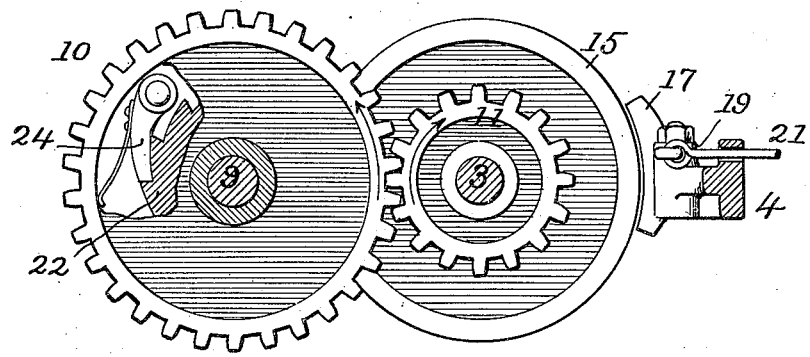
Figure 3:
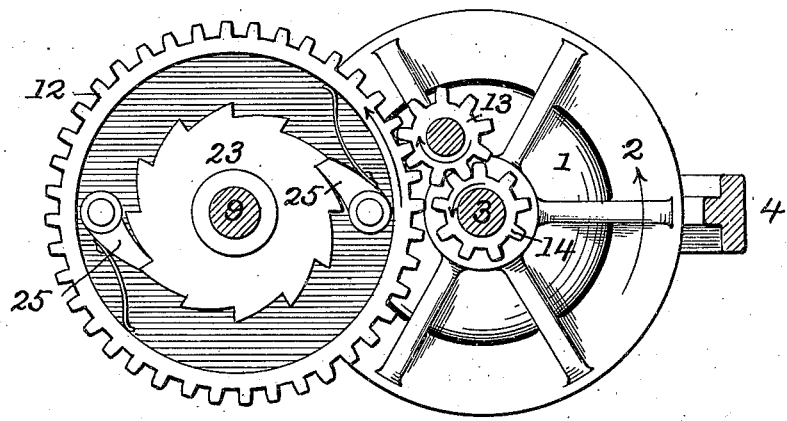

Figure 1, is a sectional elevation at line $x$—$x$, Figs. 2 and 3. Fig. 2, is a sectional elevation at line $x'$—$x'$, Fig. 1; and Fig. 3, a similar view at line $x^2$—$x^2$, Fig. 1.

Similar numerals of reference indicate like parts in the different views.

Referring to the drawings, 1, represents the armature, and 2 the field of an electric motor, mounted to revolve in opposite directions around a common axis; the field by bearings on the armature shaft 3, and the armature by means of its shaft 3 turning in bearings in a stationary supporting frame 4. A current collector 5, commutator 6, and commutator brushes 7 and 8, will be employed for feeding the current to the motor in any usual well known manner.

9, is the driven shaft, which may be the axle of a car, and which may either have bearings in, or furnish bearings for the supporting frame 4 of the motor; this driven shaft 9 is geared to the armature 1, and to the field 2, by suitable independent differential gearing connections, so as to be capable of receiving motion from either one or the other of the same, or from both conjointly; in the accompanying drawings I illustrate one type of gearing for effecting such results. In such construction as illustrated in the drawings, 10 is a gear wheel on the driven shaft 9, that meshes with and receives motion in a direct manner from a gear wheel 11, attached to and rotating with the armature 1 of the motor; and 12, is a gear wheel on the driven shaft, that receives motion in an indirect manner, through the idler or intermediate gear 13, from a gear wheel 14, attached to, and rotating, with the field 2 of the motor; the arrangement being such that the movements in opposite directions of the field and armature will be imparted to the driven shaft in one and the same direction. The relative proportions of the set of armature gears 10 and 11, and the set of field gears 12, 13 and 14, will be of a varied or differential nature, so as to impart driven speeds to the driven shaft 9, and may be proportioned so as to give any desired degree of variation required. As so arranged, both sets of gears, 10, 11, and 12, 13, 14, can be employed conjointly, (by letting the armature and field revolve freely,) to give a slow and powerful speed to the driven shaft 9, in the initial starting of the same, or whenever an excess of load is imposed thereon. In like manner the set of field gearing, 12, 13, 14, may be employed, (by clutching and holding the armature 1 from rotation,) to give a higher degree of speed to the driven shaft 9; and similarly the armature set of gearing 10, 11, can be employed, (by clutching and holding the field 2 from rotation,) to give a still higher speed to the driven shaft 9.

The use of the armature of the motor for imparting the normal or higher speed above referred to is preferred as producing the least amount of friction, &c. It is however, within the scope of the present invention to reverse the arrangement shown, and use the armature in connection with the set of intermediate speed gears 12, 13 and 14; and the field 2 in connection with the set of high speed gears 10 and 11.

In order that the change from one speed to another of the driven shaft 9, as above described, may be readily and easily obtained, I provide clutch mechanisms for engaging and holding in an independent manner, either the armature 1, or the field 2, as may be required. Any usual form or type of clutch or brake mechanism may be employed without departing from the spirit of this part of my invention. In the drawings I illustrate one type of mechanism for effecting the purpose. In the construction shown, 15 and 16 are brake wheels, attached respectively, to the armature 1, and to the field 2, and which are engaged by the respective brake-shoes 17 and 18, on the opposite ends of the brake lever 19, pivoted at its center on the supporting frame 4, or other fixed point, and having any usual form of operating connections, such as pull-rods 20 and 21, as the circumstances or particular use of the motor may indicate. It is requisite to the form of gearing illustrated, that the driven shaft 9 shall be capable of a forward rotation, independent of the gear wheels 10 and 12, so that with a partial or complete stoppage of either of the said gear 10 or 12, in the varied actions of the motor as heretofore described, the driven shaft 9 will be free to rotate at the regular speed. To admit of such independent forward movement of the driven shaft 9 as above set forth, the gear wheels 10, and 12, are each formed in two portions, an inner hub portion 22, 23, keyed or otherwise secured to the driven shaft 9, and an outer or main gear portions turning on said hub portions, with interposed ratchet or equivalent clutch connections 24, 25, between the different portions, the action of which is to form or cause a fixed attachment of that gear wheel which is acting as a driver for the driven shaft 9, and at the same time admits of the said driven shaft running loose in the other gear when the same is not acting as a driver.

While the present improvement comprehends the use of any type of motor in which the field and armature revolve in opposite directions, preference is however given to that particular type of motor in which the field magnet is of an annular form surrounding the armature, with the magnetic force applied at the outer periphery of the armature, and the inner periphery of the field or pole pieces, respectively; as with such construction a circular iron-clad type of field is provided to protect the field coils, armature, &c., from injury, and afford ample resistance to centrifugal strain upon the parts due to high speed. The main reason however, being that when a motor of greater power is required, the same can be readily attained by an increase in the length of the field and armature, without any necessary increase in the diameter of said parts.

In the practical application of the present invention to uses where the load is constantly changing, such for instance as the propulsion of street cars, and assuming the driven shaft 9 to represent the car axle. In starting the car, the current is switched directly into the motor, and the brake shoes 17, 18, are both disengaged from the brake wheels 15, 16, of the armature, and the field. Under such conditions both the armature set of gearing 10, 11, and field set of gearing 12, 13, 14, are rendered active, and as a consequence thereof a slow and powerful motion is imparted to the car axle to overcome the inertia met with in starting the car, without requiring any excessive amount of current above the ordinary to effect such result, and without any liability of overloading the motor, to cause a burning out of the same. As the inertia of the car is gradually overcome and the load upon the motor correspondingly reduced, the angular velocity of the field gearing will increase in a corresponding degree, and after the car has acquired a given speed, either the brake of the armature, or the brake of the field can be applied, in accordance with the requirement of an intermediate or a normal speed of the car.

Having thus fully described my said invention, what I claim as new, and desire to secure by Letters Patent, is—

1. A motor having its field and armature adapted to rotate in opposite directions, and gearing connections of a differential nature between each of the same and the driven shaft, substantially as set forth.

2. A motor having its field and armature adapted to rotate in opposite directions, gearing connections of a differential nature between each of the same and the driven shaft, and a clutch for engaging and holding the field from rotation, substantially as set forth.

3. A motor having its field and armature adapted to rotate in opposite directions, gearing connections of a differential nature between each of the same and the driven shaft, and clutches for independently engaging and holding the field and armature from rotation, substantially as set forth.

4. A motor having its field and armature adapted to rotate in opposite directions, and gearing connections of a differential nature between each of the same and the driven shaft, said gearing connections having a positive engagement with the driven shaft in one direction only, substantially as set forth.

5. A motor having its field and armature adapted to rotate in opposite directions, gearing connections of a differential nature between each of the same and the driven shaft, and a clutch for engaging and holding the field from rotation, the said gearing connections having positive engagement with the driven shaft in one direction only, substantially as set forth.

6. A motor having its field and armature adapted to rotate in opposite directions, gearing connections of a differential nature between each of the same and the driven shaft, and clutches for independently engaging and holding the field and armature from rotation, the said gearing connections having positive engagement with the driven shaft in one direction only, substantially as set forth.

7. A motor having its field and armature adapted to rotate in opposite directions, gearing connections of a differential nature between each of the same and the driven shaft, and clutches for independently engaging and holding the field and armature from rotation, said clutches having a common operative connection, so that the application of the one will release the other, substantially as set forth.

In testimony whereof witness my hand this 16th day of January, 1893.

CLYDE J. COLEMAN.

In presence of—
ROBERT BURNS,
GEO. H. ARTHUR.